United States Patent
Bertram et al.

[11] Patent Number: 5,818,451
[45] Date of Patent: Oct. 6, 1998

[54] COMPUTER PROGRAMMED SOFT KEYBOARD SYSTEM, METHOD AND APPARATUS HAVING USER INPUT DISPLACEMENT

[75] Inventors: Randal Lee Bertram, Raleigh; David Frederick Champion, Durham; Mary Elizabeth Taylor Hartman, Garner, all of N.C.

[73] Assignee: International Busienss Machines Corporation, Armonk, N.Y.

[21] Appl. No.: 700,609

[22] Filed: Aug. 12, 1996

[51] Int. Cl.[6] .................................................. G06F 3/00
[52] U.S. Cl. ........................ 345/354; 345/178; 341/24; 379/93.19
[58] Field of Search ................................. 395/339, 354; 364/709.12; 379/93.19; 345/173–181, 333, 334, 339, 348, 352, 354, 975; 341/24, 22, 23

[56] References Cited

U.S. PATENT DOCUMENTS

| | | | |
|---|---|---|---|
| 5,334,976 | 8/1994 | Wang | 341/22 |
| 5,627,567 | 5/1997 | Davidson | 345/173 |
| 5,661,476 | 8/1997 | Wang et al. | 341/22 |

FOREIGN PATENT DOCUMENTS 318031  12/1988  Japan .

*Primary Examiner*—A. Katbab
*Attorney, Agent, or Firm*—Jeanine S. Ray-Yarletts

[57] ABSTRACT

A computer in which entry of data from an area provided on a display, touch screen or the like is accomplished by the provision of a "soft keyboard". Misentry of data is avoided by providing for the adjustment of the input by raising the area of input by a fixed percentage of the size of the target soft key.

15 Claims, 4 Drawing Sheets

FIG. 5

COMPUTER PROGRAMMED SOFT KEYBOARD SYSTEM, METHOD AND APPARATUS HAVING USER INPUT DISPLACEMENT

RELATED APPLICATIONS

This application is one of a series of related, commonly assigned, copending applications. Applications in the series include application Ser. No. * filed *, entitled "Mobile Client Computer Programmed to Display Hexagonal Keyboard" with named inventors R. L. Bertram, D. F. Champion and L. S. Eichorn and filed under Attorney's Docket No. RP9-95-051; application Ser. No. * filed *, entitled "Mobile Client Computer Programmed to Establish Soft Keyboard Targeting Sensitivity" with named inventor R. L. Bertram and filed under Attorney's Docket No. RP9-96-011; and applications identified therein as being related to the above-mentioned applications.

BACKGROUND OF THE INVENTION

This invention relates generally to computer systems and methods of keyboard input and more particularly to improved accuracy for software implemented (programmed) keyboards known as soft keyboards.

Computers often present a "soft keyboard" to the user. The soft keyboard is typically an on-screen representation of a physical keyboard having alphanumeric characters and other controls. The following are implementations of soft keyboards:

A desktop computer which displays a soft keyboard on the monitor which the user operates with the mouse. This is most useful for small keyboards such as numeric pads.

A tablet computer which displays a soft keyboard which the user operates with a stylus. The tablet may rely exclusively on the soft keyboard for keyboard input, not providing the capability for a keyboard of physically implemented mechanical keys.

A mobile client computer system which displays a soft keyboard which the user operates by touch, in a manner similar to a traditional keyboard.

A system which gets input from a touch pad which does not overlie a display. The "keys" are permanent designs on the touch pad's surface. This is a soft keyboard since there are no mechanical keys.

The above systems only use the central portions of the rectangles to accommodate or sense a touch and to display a character or symbol, not the corners. A user's finger, mouse or stylus distributes the probable points of selection radially from the center of the soft key cell. With a rectangularly shaped "key region", the probable points of selection are still arrayed in a substantially circular form.

Wasted space in soft keyboards is a serious problem, especially on small screens such as are provided in mobile systems and especially when there are a lot of keys (e.g. alphanumeric keyboards). Hence, soft keyboards can significantly benefit from a shape for keys other than rectangular. This problem is addressed in the companion application, "Mobile Client Computer Programmed to Display Hexagonal Keyboard", identified above as being related to this application. In accordance with that invention, the problem is solved, at least in a significant part, by the provision of generally hexagonally shaped keys.

When entering data using a soft keyboard, it has been discovered that many users tend to target the lower portion of each key with their finger, input stylus or mouse pointer instead of targeting the key's center. This increases the probability of the user accidentally selecting a key below the one actually intended. It is assumed that users may do this out of a desire to avoid obscuring the character on the key with their input device.

Finally, users often miss small target areas on the screens of devices because of parallax. This occurs where the surface which senses the user's input is on a plane above the display surface, so that if the user's line of sight is not perpendicular to the two surfaces and the user's point of selection is faulty. Many devices such as hand-held computers, workstations or stand-alone systems provide parallax adjustment to offset the touch-point errors caused by the user's line of sight. It is also possible to correct for parallax in the hardware by LCD bias.

These problems present greater difficulty on soft keyboards that are small. On small devices, the size of the keyboard is limited by the screen dimensions, and the above problems are particularly severe.

OBJECTS OF THE INVENTION

It is an object of this invention to improve the accuracy of a soft keyboard by adjusting the interpretation of the sensed input to more accurately reflect what the user intends.

BRIEF SUMMARY OF THE INVENTION

With the foregoing as background, the present invention contemplates a computer in which entry of data from an area provided on a display, touch screen or the like is facilitated by the provision of an offset adjustment of the actually-sensed touch input point to properly interpret the likely desired selection or area of contact with regard to what will be the most probable area of contact on the soft keyboard. As will be brought out more fully hereinafter, the offset adjustment enables improved accuracy of data entry a user of systems embodying this invention.

A system in which the present invention is embodied may be any of the types of systems mentioned above.

BRIEF DESCRIPTION OF THE DRAWINGS

These, and still other objects of the invention will appear as the following description of the preferred embodiments proceeds, in connection with the description of a depiction of the preferred embodiments as illustrated in the accompanying drawings, in which:

FIG. 5 is an illustration of the display screen driven by the execution of an application program display certain data;

DETAILED DESCRIPTION OF THE PREFERRED EMBODIMENTS(S)

While the present invention will be described more fully hereinafter with reference to the accompanying drawings, in which preferred embodiments of the present invention are shown, it is to be understood at the outset that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
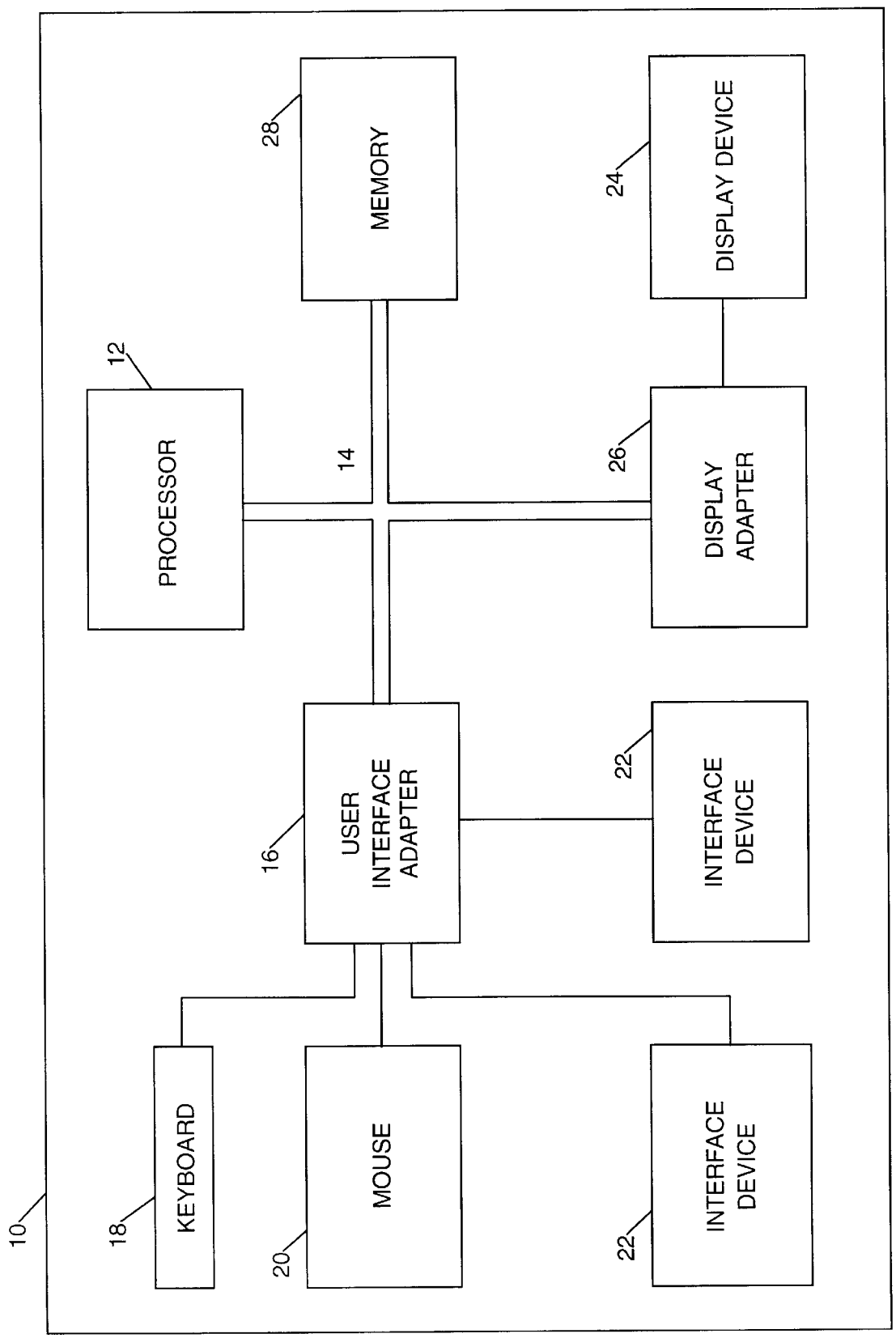
FIG. 1 is a perspective view of a representative computer system in which an improved keyboard in accordance with the present invention may be implemented.

Referring now more particularly to the accompanying Figures, FIG. 1 illustrates an exemplary embodiment of a computer system in which the present invention may be implemented. The system in accordance with the present invention may have a variety of characteristics. Central among these characteristics is that the system has the provision of allowing for input from a soft keyboard. This soft keyboard can be used with mobile communications systems and wire based communications systems as well as with individual, self-contained workstations. The soft keyboard of this invention can be implemented by using a mouse, a pen, a trackpoint, human touch or any other form of pointing device to indicate the key that is to be depressed.

FIG. 1 depicts a typical computer system 10 in which the present invention may be implemented. In this embodiment, a processor 12 is connected to a display device 24 by way of a display adapter 26. The mouse 20 is used to indicate the selection of the keys on the soft keyboard displayed on the display device 24. The processor 12 is attached to memory 28 and a user interface adapter 16. The one or more user interface adapters 16 allow communication between the processor and keyboard 18, a mouse 20, or any additional interface device(s) 22. A few examples of such interface devices are scanners, trackpoints, human touch sensitive devices and light pens. This particular invention is very useful, for example, for isolated point of sale terminals where the mouse or pointer is the only available input means.

Figure 2:
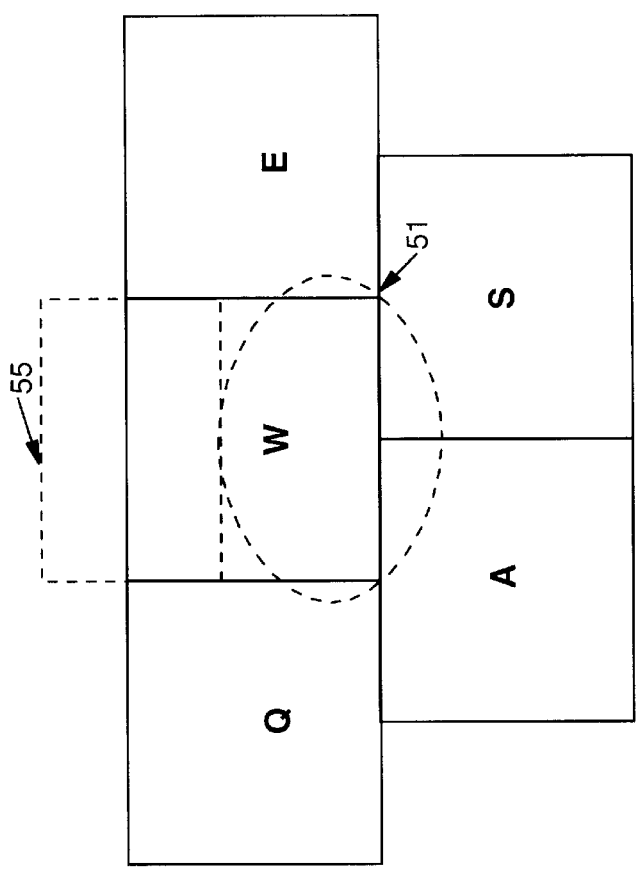
FIG. 2 depicts the area of the soft key most often contacted by a pointing device (including a human pointing device such as a user's finger)

We now address briefly the display and communication of data as contemplated in the system of this invention. Referring now more particularly to FIG. 2, there is shown there an exemplary representation of a portion of a display screen for an application program executed on the system of the present invention. Preferably, the system executes an application program such as a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of a mobile computer system with minimal resources in the mobile unit and maximum use of resources available through the supporting server and/or mainframe data storage. This is meant as merely an example and not intended to limit the scope of the application in any manner.

More particularly, referring back to FIG. 1, the processor 12 of the computer system 10 executes an operating system program and a browser program stored in the system memory. In executing these programs, the system exchanges data with memory or with a supporting server by passing data through a communications link which may be a radio link provided by a transceiver and interface or, if wire connected, via a modem. Data so exchanged may be stored for manipulation by the operating system and browser in the system DRAM memory. The browser, in conjunction with the data obtained from the memory of supporting server, will display on the screen which may, for example, appear as shown in FIG. 5.

Figure 5:
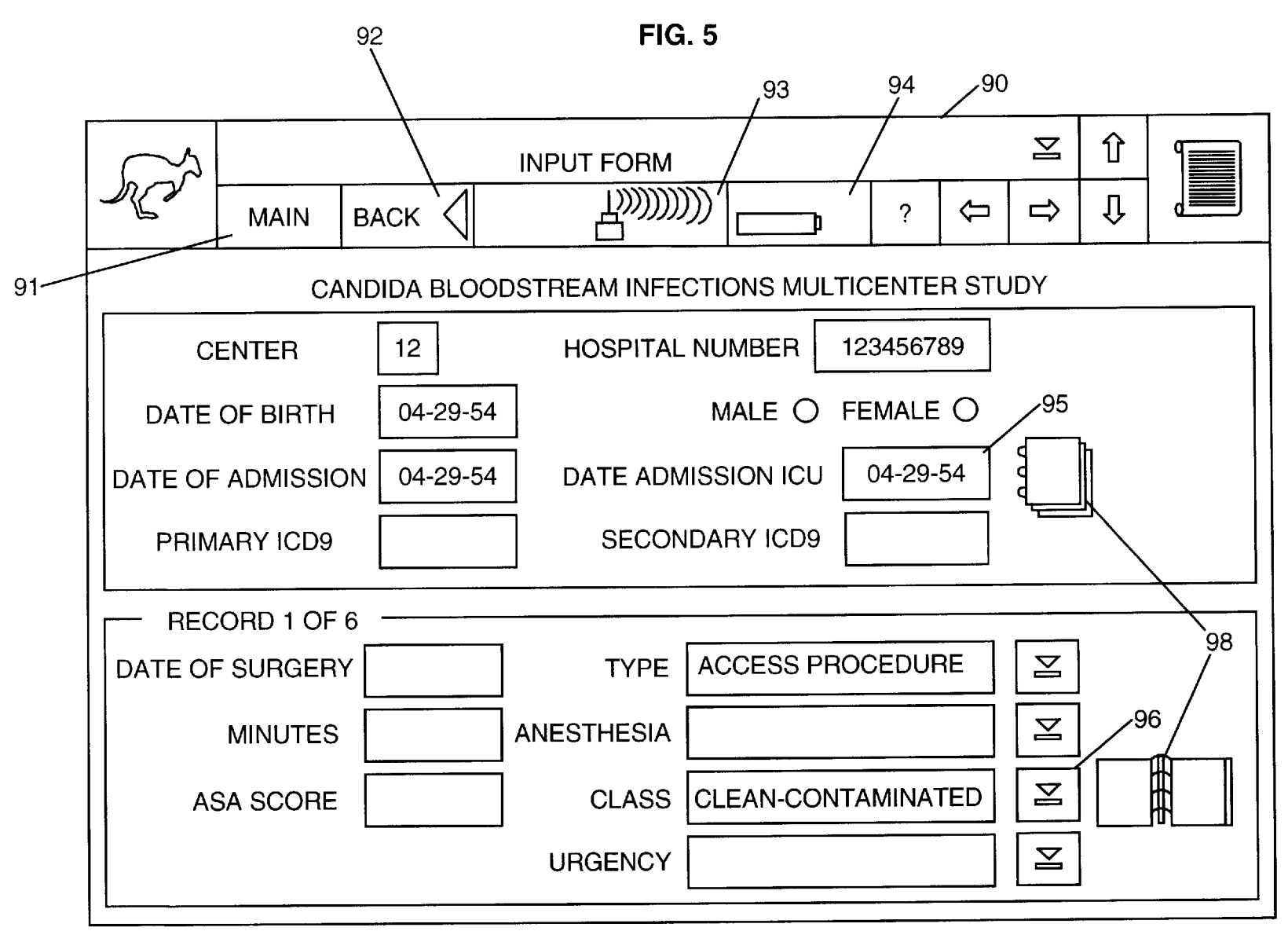

The screen shown in FIG. 5 has a title bar 90 across the upper limit of the displayed field and, within the displayed field, a data entry form having defined fields for data such as identifying numerals or names. There are also provided, immediately below the title bar 90, indications of function "buttons" such as a return to the main (or initial) screen button 91, a go back one screen button 92, an exchange data by wireless link button 93, a battery charge state button 94, and buttons for control for navigation about the screen. Certain fields, such as the Date of Admission to the ICU field 95 and the Class 96 fields, may be annotated by a user, and are so indicated by the positioning adjacent those fields of a "notebook" icon, 98. The notebook may be either closed (as adjacent the Date of Admission field 95) suggesting that it presently lacks any annotation, or opened (as adjacent the Class field 96) suggesting that it presently contains an annotation.

Inasmuch as the system 10 has a touch screen, input of data into the system can be accomplished by a stylus, pointer or finger applied to fields of the touch screen. Thus, referring to FIG. 5, should a user desire to input information identifying the gender of a particular patient, the user could target or touch (with stylus, pointer or finger) the buttons "male" or "female" to enter that data. Similarly, should a user wish to enter an annotation, the user could target or touch the field defined by the notebook icon to change the icon between the closed and open states and thereby open a field for entry of appropriate numerical or alphabetic data. Display of such fields results from execution of a control program by the processor of the system.

Other and further functions of the control and application programs and the screen display will become more clear from discussion which follows or appears in the above identified related applications.

As will be understood, the area available for display of screens in a system of the type here described is limited even more so that in a traditional computing environment. Such limitations impose severe restrictions on the front of screen technology used in generating displays and in providing for the input of data using a touch screen shown on the display area. The present invention contemplates that stored control programs accessible to the processor of a system will cooperate with the other elements present, when executing on the processor, in accommodating the restricted display area to the needs of users of the system. This invention focuses particularly on certain of such needs and for this reason this invention is most appropriate for implementation in a mobile environment; however, it is useful in stationary computer systems as will be appreciated by those of skill in the art.

Figure 6:
FIG. 6 is an illustration similar to FIG. 5 showing an implementation of a hexagonal key soft keyboard in accordance with this invention.

In the illustrated embodiment, the present invention uses a soft keyboard displayed on the touch screen as illustrated in FIG. 6. The arrangement of the keys shown in FIG. 6 includes generally hexagonally-shaped cells as keys and is illustrative only, as many other arrangements are possible. The soft keyboard may occupy a window displayed over the remainder of the display screen when needed for entry of alphanumeric data, or the soft keyboard may occupy a window which remains in position as a portion of the display at all times, alternatively, it may occupy the entirety of the available display area during use, depending upon the particular application programs with which the keyboard may interact.

Most of the illustrated keys are regular hexagons, with the exception that the top and bottom row of keys are truncated in order to fit into a rectangle; some keys are "extended" hexagons, such as the "Space" key (this type of key is irregular itself, and also truncates the keys above and below); and the columns of keys on the right and left are rectangular. The interested reader is referred to the related application entitled "Mobile Client Computer Programmed to Display Hexagonal Keyboard" mentioned above for further discussion.

The present invention contemplates that the problems of targeting soft keys generally, regardless of their shapes, are solved by the cooperation of a control program and the system processor for determining the most probable errors or offsets encountered when a user enters data using a soft keyboard. It has been statistically proven that, when typing on a soft keyboard, a user tends to tap on the lower portion of each key. FIG. 2 depicts the statistically most probably area of selection or contact 51 for a person using a soft keyboard that is typing the 'W' key. If using the traditional method of interpreting or sensing key strokes, there is a high probability of the user accidentally invoking a key other than the one desired using a soft keyboard. It appears that this tendency manifests itself due to the user's desire not to obscure the character being selected with their finger or input stylus. This leads to the result that a typical user almost never selects a soft key by touching it in the area above the target figure indication 55. This results in a significant error rate if the selectable bottom margin on the soft keys is not adequate. It also creates a significant waste of space since the area above the target letter 55 is almost never intentionally tapped. This problem becomes more significant as the display screen or area of the screen occupied by the soft keyboard becomes smaller.

The present invention is a method and system for adjusting or shifting the computer-recognized point of selection for a soft keyboard upward, but only for selectable objects such as the keys of the soft keyboard. The system first applies to all sensed inputs the normal parallax adjustment that is well known in the art. This accounts for the user's line of sight being other than perpendicular with the screen surface. Then the system shifts or adjusts the sensed touch input upward by a predetermined amount if the selection is sensed to be in a region of selectable objects such as the keyboard.

Figure 4:
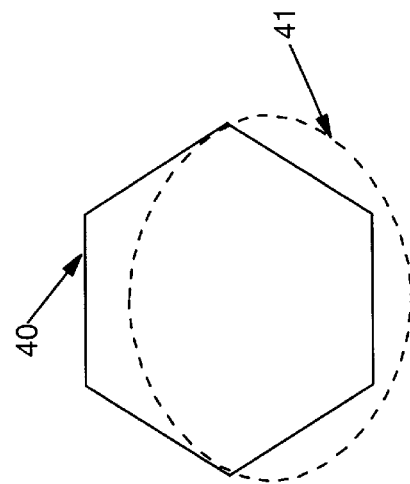
FIG. 4 is a schematic illustration of a hexagonal key element and the likely area of selection of a user's targeting.
Figure 3:
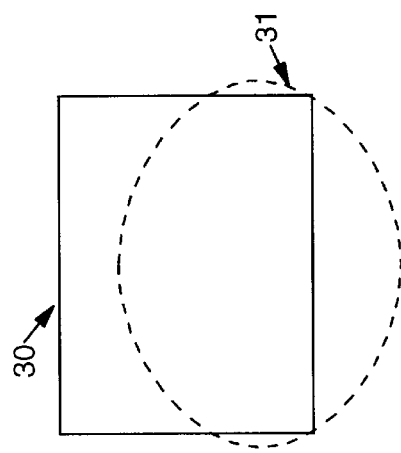
FIG. 3 is a schematic illustration of a rectangular key element and the likely area of selection of a user's targeting.

FIG. 3 depicts the most probable area of selection contact 31 on a soft keyboard implemented using rectangularly-shaped cells 30 to represent the soft keys. FIG. 4 depicts the most probable area of selection contact 41 for a soft keyboard implemented using hexagonally-shaped cells 40 to represent the soft keys. While the hexagonally-shaped key implementation reduces the probability of error, there is still room for improvement.

Since testing has proven that users virtually never tap on the top 25% of a key on a soft keyboard unless they meant to select the key above, the user's input as sensed by the computer can safely be shifted upward by up to 25% of the height of a row of keys. This 25% rule is consistent for both left-handed and right-handed users. This has also been shown to reduce the errors encountered due to tapping below the key that the user has meant to select.

Since the 25% has been determined to be consistent for all users, it is not necessary to make the 25% adjustable. The preferred embodiment, though, allows for the 25% offset to be selectively turned on and off by inputting a selectable escape sequence. The predetermined fixed percentage for shift is not meant to limit the invention. The invention applies to any percentage offset. Twenty-five percent is just used in the preferred embodiment as the best available implementation.

The offset is applicable not only to soft keys, but also to other selectable items such as icons, hypertext links, and so forth. This is because users may tend to select these items by targeting the bottoms of the items instead of the centers, just as with a soft keyboard. Examples of other systems in which the keyboard of this invention will have utility are shown and described in U.S. Pat. No. 5,539,479 issued Jul. 23, 1996, commonly assigned herewith, and to which the interested reader is referred.

In the drawings and specifications there has been set forth a preferred embodiment of the invention and, although specific terms are used, the description thus given uses terminology in a generic and descriptive sense only and not for purposes of limitation. Therefore, what is desired to be protected by Letters Patent is set forth in the appended claims by way of illustration and description only and not by way of limitation.

What is claimed is:

1. A computer system comprising:
   a processor for processing digital data;
   memory coupled to said processor for storing digital data;
   a display device coupled to said processor and said memory to display information derived from digital data processed by said processor;
   an input device for selecting information on said display; and
   a control program stored in said memory and accessible by said processor to direct the processing of digital data by said processor;
   said control program and said processor cooperating, when said control program is executing on said processor, to:
   (a) display a soft keyboard formed by a plurality of adjoining cells on said display device, each of said cells representing a soft key and having an indicated zone; and
   (b) adjusting said information sensed as selected by said input device by shifting the indicated zone of sensed selection by a percentage of the size of said soft key displayed on said display device.

2. A computer system as claimed in claim 1 wherein said input is further adjusted for parallax.

3. A computer according to claim 1 or 2 wherein said control program and said processor cooperate, when said control program is executing on said processor, in defining a selectable escape sequence by which a user may terminate the adjustment of said information by said fixed percentage.

4. A display generating and input selection sensing system comprising:
   a processor processing digital data;
   memory coupled to said processor for storing digital data;
   said processor and said memory cooperating in supplying digital data driving a display of visual images on a display device;
   an input device capable of indicating selectable areas on said display device; and
   a control program stored in said memory and accessible by said processor to direct the processing of digital data by said processor;
   said control program and said processor cooperating, when said control program is executing on said processor, to:
   (a) supply digital data driving a display of at least one selectable item defined by a predetermined cell in a zone of said display having an entry selectable by a user indicating said zone; and
   (b) adjust a data entry selected by said input device by shifting the indicated zone of sensed selection by a percentage of the size of said soft key displayed on said display device.

5. A display generating system as claimed in claim 4 wherein said data entry selected by said input device is adjusted for parallax by said control program and said process cooperating when said control program is executed.

6. A system as claimed in claim 4 or 5 wherein said data entry adjustment by a percentage of the size of said soft key can be selectively initiated or terminated.

7. A method for interpreting input to a computer system comprising the steps of:

displaying a set of soft keys on a display device;

capturing input from an input device;

shifting said input representing said soft key by a percentage of said soft key's physical size, and;

passing said shifted input to an application program.

8. The method as claimed in claim 7, further comprising the step of adjusting said input for parallax prior to passing said adjusted input to an application program.

9. A soft keyboard apparatus comprising:

a display device coupled to a computer processor;

means for displaying one or more soft key cells comprising said soft keyboard on said display device.;

means, coupled to said means for displaying, for selecting input of one or more soft key cells of said soft keyboard; and, means for shifting said selected input by a percentage of the cell size of said selected soft key.

10. A soft keyboard apparatus as claimed in claim 9 wherein said means for selecting comprises a mouse, trackpoint, or trackball.

11. A soft keyboard apparatus as claimed in claim 9 wherein said means for selecting comprises a pen.

12. A soft keyboard apparatus as claimed in claim 9 wherein said means for selecting comprises a touch sensitive screen.

13. A computer system comprising:

a processor for processing digital data;

memory coupled to said processor for storing digital data;

a display device coupled to said processor and said memory to display information derived from digital data processed by said processor;

an input device for selecting information on said display; and a control program stored in said memory and accessible by said processor to direct the processing of digital data by said processor;

said control program and said processor cooperating, when said control program is executing on said processor, to:
 (a) display a soft key formed by one or more cells on said display device, each of said cells representing a soft button and having an indicated zone; and
 (b) adjusting said information sensed as selected by said input device by shifting the indicated zone of sensed selection by a percentage of the size of said soft button displayed on said display device.

14. A computer system as claimed in claim 13 wherein said input is further adjusted for parallax.

15. A soft button apparatus comprising:

a display device coupled to a computer processor;

means for displaying one or more soft button cells on said display device.;

means, coupled to said means for displaying, for selecting input of one or more soft button cells; and, means for shifting said selected input by a percentage of the cell size of said selected soft button.

* * * * *